United States Patent [19]

Deer et al.

[11] Patent Number: 5,318,454
[45] Date of Patent: Jun. 7, 1994

[54] OFF-MODULE BUS ELECTRICAL SYSTEM (C-13)

[75] Inventors: Steven C. Deer, Kentwood; Scott H. Russell, Kalamazoo, both of Mich.

[73] Assignee: Steelcase Inc., Grand Rapids, Mich.

[21] Appl. No.: 991,526

[22] Filed: Dec. 15, 1992

[51] Int. Cl.⁵ .......................................... H01R 25/00
[52] U.S. Cl. ................................. 439/215; 29/869
[58] Field of Search ........................... 439/209–211, 439/215; 29/869

[56] References Cited

U.S. PATENT DOCUMENTS

| Re. 31,733 | 11/1984 | Haworth et al. . |
| 2,608,634 | 8/1952 | Abbott . |
| 3,466,052 | 8/1969 | Hukin . |
| 3,715,627 | 2/1973 | D'Ausilio . |
| 4,043,626 | 8/1987 | Propst et al. . |
| 4,044,971 | 9/1991 | Hollingsworth . |
| 4,135,775 | 1/1979 | Driscoll . |
| 4,146,287 | 3/1979 | Jonsson . |
| 4,203,639 | 5/1980 | Vandenhoek et al. . |
| 4,235,496 | 11/1980 | Propst et al. . |
| 4,270,020 | 5/1981 | Kenworthy et al. . |
| 4,278,834 | 7/1981 | Boundy . |
| 4,295,697 | 10/1981 | Grime . |
| 4,313,646 | 2/1982 | Millhimes et al. . |
| 4,370,008 | 1/1983 | Haworth et al. . |
| 4,376,561 | 3/1983 | Vanden Hoek et al. . |
| 4,377,724 | 3/1983 | Wilson . |
| 4,382,648 | 5/1983 | Propst et al. . |
| 4,682,457 | 7/1987 | Spencer . |
| 4,631,881 | 12/1987 | Charman . |
| 4,684,186 | 8/1987 | Hetherington . |
| 4,688,869 | 8/1987 | Kelly . |
| 4,775,328 | 10/1988 | McCarthy . |
| 4,781,609 | 11/1988 | Wilson et al. . |
| 4,808,768 | 2/1989 | Sireci . |
| 4,918,886 | 4/1990 | Benoit et al. . |
| 4,952,164 | 8/1990 | French et al. . |
| 5,096,433 | 3/1992 | Boundy . |
| 5,096,434 | 3/1992 | Byrne . |
| 5,104,332 | 4/1992 | McCoy ................. 439/215 X |

FOREIGN PATENT DOCUMENTS 2080047 of 0000 United Kingdom .

*Primary Examiner*—Eugene F. Desmond
*Attorney, Agent, or Firm*—Price, Heneveld, Cooper, DeWitt & Litton

[57] ABSTRACT

A power distribution system includes powerways and power outlets for positioning in a plurality of furniture units. The powerways may include a plurality of power blocks each having at least three hermaphrodite ports. The power blocks of each powerway are interconnected by flexible conductors. Outlet blocks for the system include a flexible conductor and a connector for connection to the port. The hermaphrodite ports are for connection with other power blocks, outlet blocks, and a power tap-in.

9 Claims, 4 Drawing Sheets

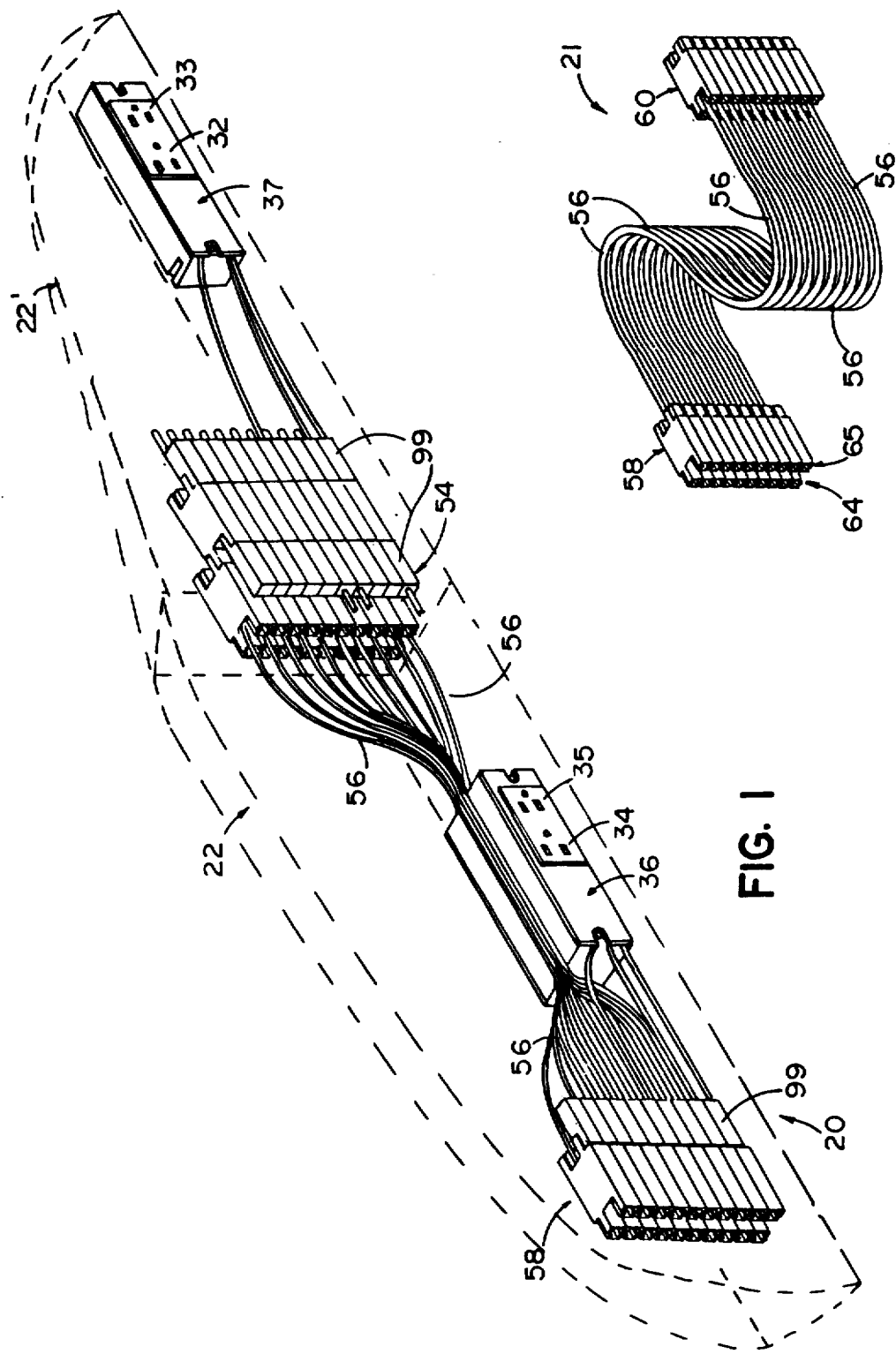

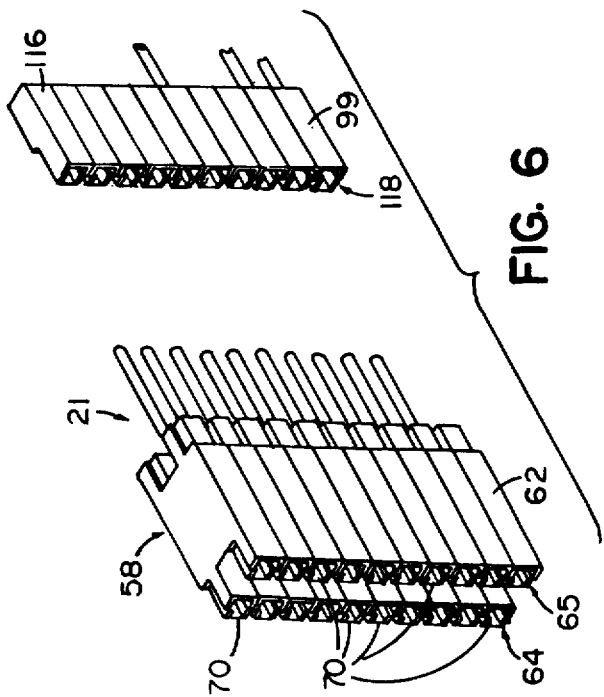
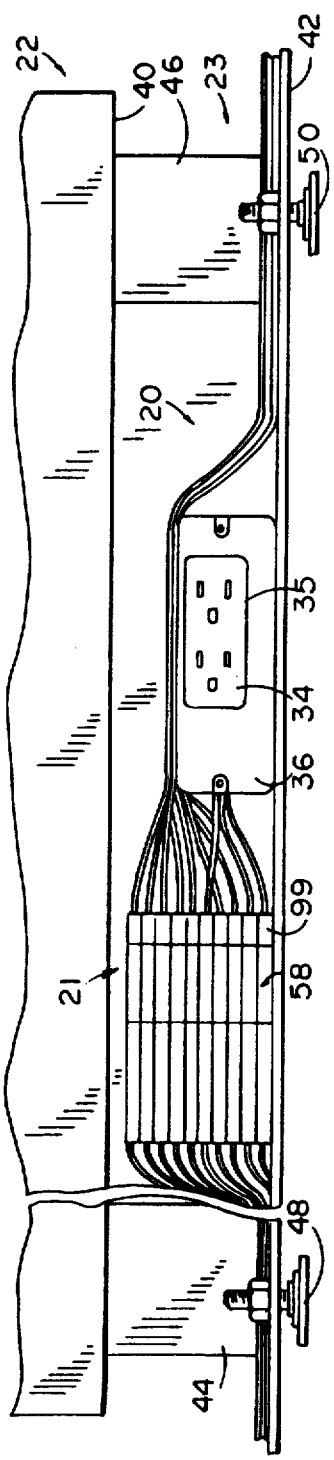
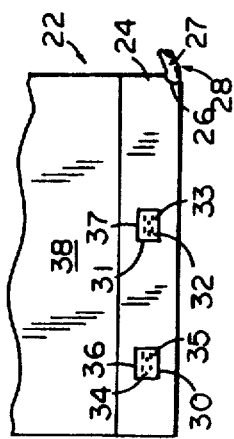
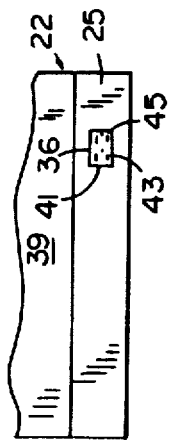

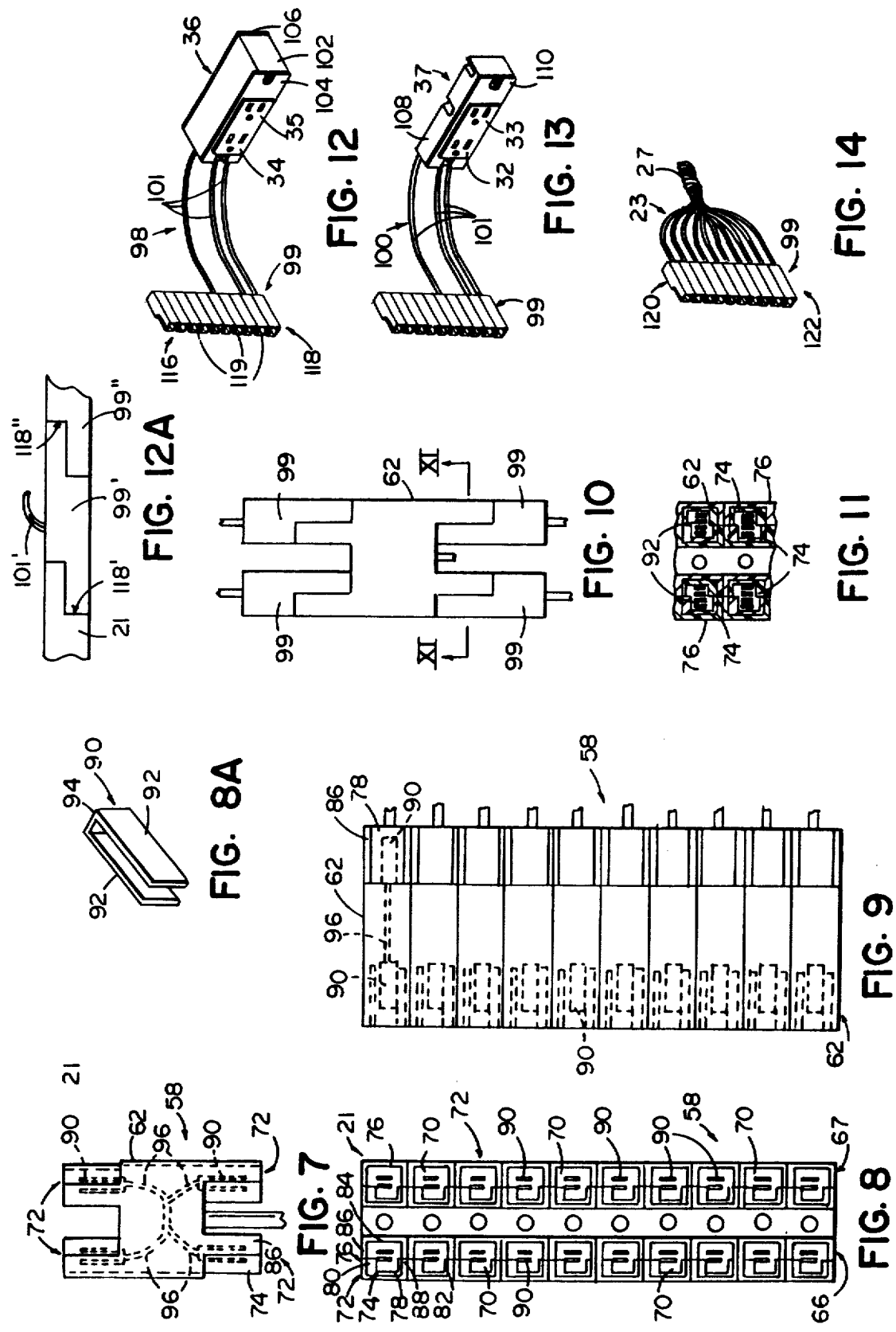

OFF-MODULE BUS ELECTRICAL SYSTEM (C-13)

BACKGROUND OF THE INVENTION

The present invention relates to electrification of office furniture and the like, and in particular to a modular power distribution unit therefor.

Open offices are well known and generally comprise large open floor spaces that are divided into individual offices or workstations. Several different furniture arrangements are presently available to divide such open office spaces and include partition panels, system furniture and modular furniture. These office arrangements are widely utilized as they are relatively easy to install, convenient to rearrange after installation, attractive in appearance and allow a large number of offices or workstations to be installed within an open floor space.

It is desirable that office furniture unit include an electrical wiring system of some type. Such wiring systems preferably provide electrical power to various workstations for typewriters, computers, dictating equipment, lights, clocks and other electrical appliances. The wiring system should not detrimentally effect the ease of installation, the convenience of rearranging the furniture after installation, or the attractive appearance of the furniture. Thus, to facilitate electrification, many furniture units include a utility raceway associated therewith in which the wiring system is housed.

A wide variety of wiring systems for such office furniture units are currently available. These wiring systems employ different techniques and arrangements to conduct electrical power through the office furniture unit and interconnect the powerways associated with adjacent furniture units. Versatility, durability, electrical integrity, convenience of installation and rearrangement of furnished units, and overall safety are all important design considerations for such wiring systems.

Known wiring systems include respective powerways associated with each furniture unit. Electrical connector are provided at the ends of each powerway. The connectors of adjacent powerways are interconnected to form a wiring system for a furniture system. However, these wiring arrangements require that a powerway be matched to the length of the furniture unit such that the end connectors are positioned at the ends of the furniture.

To permit branching, known powerways have a multiple port connector on one end and a single connector on the other end. The multiple port connectors permit two single connectors associated with two powerways to connect to the multiple port connector of another powerway A number of powerways are thus connected where adjacent panel units converge. However, it can be difficult for an installer to connect the powerways and furniture units in the limited space available where adjacent furniture units abut.

An additional difficulty of known electrical systems is that they are constructed to position outlets at certain predetermined locations. Furniture has access openings at those specific locations serviced by the powerway. However, since these locations are fixed, an installer may not be able to optimally position power outlets for a particular workstation. Accordingly, users may be required to use extension cords to reach the power outlets. These cords can present certain safety concerns, and are unsightly in formal office settings.

SUMMARY OF THE INVENTION

A powerway for furniture units according to one aspect of the invention includes a first power block having a housing including at least three substantially identically configured hermaphrodite ports. These ports include apertures and hermaphrodite contacts for connection with similar contacts in other power blocks, a power-in coupled to a source of power, and means for providing a power outlet.

According to another embodiment of the invention, a powerway includes two power blocks each including at least three substantially identically configured hermaphrodite ports. Contacts are positioned within each port for connection with other contacts in similar ports, a power-in coupled to a source of power and means for providing a power outlet. The two power blocks of the powerway are flexibly connected by a plurality of conductors interconnecting the contacts in the first and second power blocks. The powerways provide at least six identical hermaphrodite ports for branching, power-in, or power receptacles. Additionally, the flexible conductors allow manipulation of the relative position of the first and second power blocks for ease of installation.

According to another aspect of the invention, a power distribution system including a powerway has a power outlet, a power-in and a plurality of power blocks, each of the power blocks having a housing adapted to be positioned within the utility raceway of an associated one of the furniture units and a plurality of substantially identical hermaphrodite connectors. The power outlet and power-in include connectors which connect with the power blocks. The power blocks are all configured to be interconnected. Thus, the power-in and outlets are connected to the power blocks and the power blocks are interconnected to provide a readily reconfigurable versatile power distribution system with branching, power-in and power outlets for furniture units.

These and other objects, aspects and features of the invention will be more fully understood and appreciated by reference to the written specification in the appended drawings.

BRIEF DESCRIPTION OF THE DRAWINGS

FIG. 1 is a fragmentary perspective view of panel units with a wiring system according to the invention;

FIG. 2 is a perspective view of a powerway of the wiring system according to FIG. 1;

FIG. 3 is a fragmentary front elevational view of a panel unit wiring system according to FIG. 1;

FIG. 4 is a fragmentary front elevational view of a panel according to FIG. 1;

FIG. 5 is a fragmentary rear elevational view of a panel according to FIG. 1;

FIG. 6 is a fragmentary perspective view of a powerway and connector according to FIG. 1;

FIG. 7 is a fragmentary top plan view of the powerway according to FIG. 6;

FIG. 8 is a side elevational view of a powerway according to FIG. 6;

FIG. 8a illustrates a hermaphrodite contact;

FIG. 9 is a fragmentary front elevational view of a powerway according to FIG. 6;

FIG. 10 is a fragmentary top plan view of connectors and a powerway interconnected;

FIG. 11 is cross-sectional view taken along plane XI—XI in FIG. 10;

FIG. 12 is a perspective view of a full panel width outlet unit according to FIG. 1;

FIG. 12a is a fragmentary top plan view of an alternate embodiment of the connector of FIG. 10 connected with a power block and a connector.

FIG. 13 is a perspective view of a partial width outlet unit according to FIG. 1;

FIG. 14 is a perspective view of a power-in according to FIG. 1;

DETAILED DESCRIPTION OF THE PREFERRED EMBODIMENT

Figure 15:
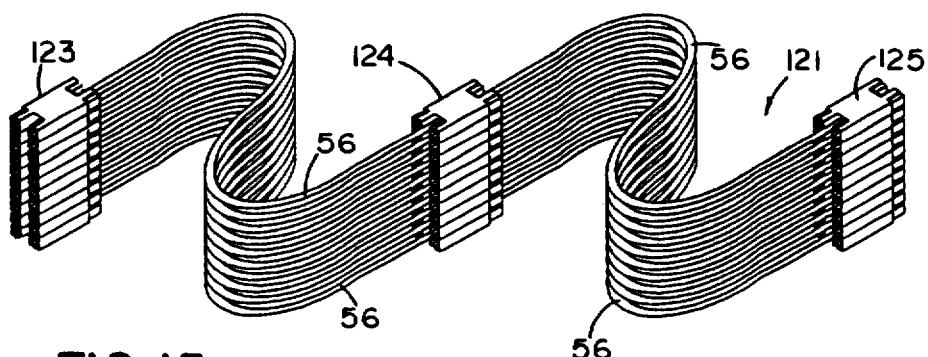
FIG. 15 is an alternate embodiment of the powerway according to FIG. 2.

A wiring system 20 (FIG. 1) according to the illustrated embodiment of the invention is adapted for use in various types of office furniture. The wiring system includes a powerway 21 (FIGS. 1 and 2) which is particularly useful in office furniture of the type having a utility raceway. An example of such furniture is partition panels 22 and 22' (FIG. 1). Panel 22 (FIGS. 1 and 3) includes a utility raceway 23 (best illustrated in FIG. 3) along a bottom edge thereof. However, powerway 21 can be utilized in a utility raceway which extends along the top edge of the partition panel or intermediate top and bottom edges of the partition panel. Powerway 21 may also be utilized with system furniture, which is often used in conjunction with a partition panel system or includes work surface wiring arrangements. Modular furniture is also a contemplated application of the powerway. Hence, "furniture" as used herein includes all such furniture arrangements as well as their equivalents. Those skilled in the art will recognize that powerway 21 will also find application in other similar settings and applications.

As illustrated in the drawings, partition panel 22 (FIG. 3) has a conventional construction such as the panel construction disclosed in the U.S. Pat. Nos. 4,203,639; 4,308,418; 4,376,561; and 4,429,934, which are incorporated herein by reference. In this example, each partition panel 22 has a utility raceway 23 extending along the bottom edge of the panel. The raceway is enclosed by base trim covers 24 (FIG. 4) and 25 (FIG. 5) connected to panel 22 to enclose raceway 23. Base trim cover 24 (FIG. 4) includes an optional opening 26 through which an associated cable 27 of a power tap-in 28 protrudes. Base trim cover 24 includes an opening 30 through which outlets 34 (FIGS. 1, 3, 4 and 12) and 35 in an outlet block 36 are accessed. Base cover 24 also includes an opening 31 through which outlets 32 (FIGS. 1, 4 and 13) and 33 of an outlet block 37 are accessed. Base trim cover 25 (FIG. 5) includes an opening 41 through which outlets 43 and 45 of outlet block 36 are accessed. Partition panel 22 preferably includes opposite faces 38 (FIG. 4) and 39 (FIG. 5) with a base trim cap 40 (FIG. 3) extending along the bottom side thereof. A base trim plate 42 (FIG. 3) extends along utility raceway 23 and has its opposite ends connected with and supported by supports 44 and 46. The utility raceway 23 thus extends between the base trim plate 42 and the base trim cap 40. A pair of adjustable feet 48 and 50 are mounted in supports 44 and 46 and support partition panel 22 to fit vertically on a horizontal floor.

Wiring system 20 (illustrated in FIGS. 1 and 3) is shaped to be received within utility raceway 23. In general, wiring system 20 includes one or more powerways 21 (FIG. 2), one or more outlet blocks 36 (FIG. 12) and 37 (FIG. 13), one power tap-in 28 (FIG. 14) and one or more optional light harnesses 54 (FIG. 1). Powerway 21, outlet blocks 36, 37, and power tap-in 28 are assembled in furniture to form the wiring system described in greater detail herein below. Powerway 21 includes power blocks 58 and 60 and ten powerway conductors 56 (only some of which are numbered) providing an electrical bus through powerway 21 and panel 22. Light harness 54, power tap-in 28, and power blocks of adjacent powerways connect to powerway conductors 56 through power blocks 58 and 60 when assembled to powerway 21 as also described in greater detail hereinafter.

Somewhat more particularly, power blocks 58 and 60 of powerway 21 are substantially identical, and accordingly, only power block 58 is described in greater detail hereinafter. Power block 58 (FIGS. 6-11) includes a housing 62. Housing 62 is of any suitable construction such as an integrally molded organic polymer. By way of example, the housing may be constructed from a plurality of housing sections (not shown) which are affixed to one another conventionally to form the housing.

Housing 62, according to the preferred embodiment of the invention, includes four hermaphrodite ports 64-67 (FIGS. 6 and 8). It will be recognized that the power blocks could alternatively include male and female ports. Ports 64-67 are identical. Each port includes ten vertically arranged apertures 70 (only some of which are numbered). Each aperture 70 includes a silo 72 formed by a U-shaped inner section 74 (FIG. 8) and a U-shaped outer section 76. Inner section 74 is smaller than outer section 76. Inner section 74 includes a wall 78 and walls 80 and 82 extending orthogonally from wall 78. Outer section 76 includes a wall 84 and walls 86 and 88 extending orthogonally from wall 84. Inner section 74 is sized to fit inside, and abut with, outer section 76 of another port when two hermaphrodite ports are interconnected as illustrated in FIGS. 10 and 11. Sections 74 and 76 are preferably integrally molded with housing 62. However, any suitable conventional construction may be utilized to provide sections 74 and 76 of silo 72. According to the preferred embodiment of the invention, a hermaphrodite contact 90 (FIGS. 7, 8, 8a and 9) is positioned within each silo 72 of housing 62. Although not specifically illustrated in the drawings, those skilled in the art will recognize that male and female contacts may be used in the ports of the power distribution system. Sections 74 and 76 of silos 72 circumscribe contacts 90 to protect these contacts and provide a secure friction connection between interconnecting ports.

Ports 64-67 provide four columns and ten rows of apertures with respective contacts 90 positioned therein. The contacts positioned in the four openings of each row are electrically connected by respective power block conductors 96. Thus, the four contacts of the top row are interconnected, the four contacts of the second row are interconnected, the four contacts of the third row are interconnected, the four contacts of the fourth row are interconnected, the four contacts of the fifth row are interconnected, the four contacts of the sixth row are interconnected, the four contacts of the seventh row are interconnected, the four contacts of the eighth row are interconnected, the four contacts of the ninth row are interconnected, and the four contacts of the tenth row are interconnected. The four interconnected contacts of each of the ten rows are connected to a respective one of the powerway conductors 56.

Hermaphrodite contacts 90 are U-shaped. Each contact includes two spaced arms 92 (FIG. 8a) extending orthogonally from a shoulder 94. Arms 92 are resilient to wipe and engage other contact arms when two hermaphrodite contacts are interconnected. Hermaphrodite contacts 90 are of any suitable construction such as a stamped electrically conductive metal alloy. Wiring system 20 includes two types of outlet units 98 (FIG. 12) and 100 (FIG. 13). Outlet units 98 and 100 include a hermaphrodite connector 99 adapted to be connected to any one of ports 64–67 of power blocks 58 and 60. Connectors 99 are connected to respective ones of outlet blocks 36 and 37 by three conductors 101. The length of connectors 101 vary to facilitate locating outlet blocks without having excess lengths of conductor, as described in greater detail with reference to FIG. 16. The conductors are used to select the power supply circuit and ground connection to outlet blocks 36, 37 as also described in greater detail herein below.

Outlet unit 98 includes outlet block 36 having a depth which extends the full width of the panel to provide outlets on both sides of partition panel 22. Outlet block 36 includes a housing 102 (FIG. 12) and outlet face plates 104 and 106 assembled thereto. Each of the illustrated outlet face plates provides openings for a duplex outlet (i.e., 34, 35 and 43 (FIG. 5), 45) such that outlet block 98 provides four power outlets for partition panel 22. However, each face plate may include one or more outlets. Each of the outlets provided by outlet block 36 is of a conventional construction including female contacts for connection with the blades of a conventional power plug of the type used with electronic clocks, radios, electric typewriters, lamps and the like.

Outlet block 100 includes a housing 108 having a depth which extends no more than half the width of partition panel 22. An outlet face plate 110 is affixed to housing 108 and preferably includes a duplex outlet (32, 33). It will be recognized that face plate 110 of outlet block 100 may include more power outlets. Each of the power outlets provided by outlet block 100 is of a conventional construction including female contacts (not shown) for connection with the blades of a conventional power plug of the type used with electronic clocks, radios, electric typewriters, lamps and the like. Because the depth of outlet block 100 is no more than half the width of partition panel 22, two such outlet units may be positioned back-to-back in utility raceway 23.

Regardless of whether full width outlet block 36 or half width outlet block 37 is utilized, the power outlets provided by the outlet blocks are connected to powerway 21 using a hermaphrodite connector 99. Power-in 28 and optional light harness 54 also include a hermaphrodite connector 99. Hermaphrodite connectors 99 are identical and include a housing 116 (FIG. 12) of any suitable construction such as an integrally molded organic polymer. Housing 116 includes a hermaphrodite port 118 identical to each of the hermaphrodite ports 64–67 on power block housing 62. Port 118 includes apertures 119. Connector 99 also includes hermaphrodite contacts (not shown), identical to contacts 90, in each aperture 119 (only some of which are numbered). Accordingly, hermaphrodite connector 99 may be assembled to any one of ports 64–67 on power blocks 58 and 60.

Power-in to wiring system 20 is provided by a power tap-in 28 as described briefly above. Power-in 28 includes a housing 120 (FIG. 14) having a hermaphrodite port 122 identical to port 118 and ports 64–67. The power tap-in 28 includes ten conductors in a cable 27, which in the preferred embodiment are connected to four live conductors, four neutral conductors at safety ground and isolated ground respectively. However, those skilled in the art will recognize that any number of conductors may be used in the powerway. It will also be recognized by those skilled in the art that conductors 64–67 may be connected to circuits other than power supplies, such as communication circuits. In one embodiment of the invention, powerway conductors 56 are connected to respective power supply circuits through power tap-in 28. First and second ones of conductors 56 are connected to a live conductor and a neutral conductor of a first power supply. Third and fourth ones of conductors 56 are connected to a live conductor and a neutral conductor of a second power supply. Fifth and sixth ones of conductors 56 are connected to a safety ground and isolated ground respectively. Seventh and eighth ones of conductors 56 are connected to the live and neutral conductors of a third power supply. Ninth and tenth ones of conductors 56 are connected to live and neutral conductors of a fourth power supply. The ten conductors thus facilitate connection to all four supply circuits through ports 64–67.

A connector 99' according to an alternate embodiment of the invention is illustrated in FIG. 12a. Connector 99' is identical to connector 99 except that it includes two hermaphrodite ports 118' and 118". Ports 118' and 118" are identical to port 118. The contacts 90 in Ports 118' and 118" are interconnected through connector 99'. Because connector 99' includes two ports, when one port (e.g., port 118') is connected to one port of a power block 21, another connector 99" may be connected to the other port (e.g., port 118"). Accordingly, the number of ports available at power block 21 is not diminished when connector 99' is connected to one port of power block 21.

A powerway 121 (FIG. 15) according to an alternate embodiment of powerway 21 includes three power blocks 123–125. Power blocks 123–125 are identical to power block 58 and 60 and include hermaphrodite contacts 90. Although not illustrated in the drawings, it will be recognized that one or more power blocks 123, 124, 125 may include two or more ports. Respective hermaphrodite contacts 90 in each of the power blocks are interconnected by respective conductors 56. Powerway 121 is preferably longer than powerway 21. The center power block 124 provides access to ports intermediate the ends whereby powerway 122 may extend over longer distances than powerway 21 and still provide ports at all panel locations requiring power outlets. Those skilled in the art will recognize that a powerway could include four or more power blocks to provide additional length to the powerway. By providing a powerway with more power blocks over a greater length the number of powerways and power blocks can be reduced without affecting the utility of the powerway. This reduces the number of connections required in the powerway.

Figure 16:
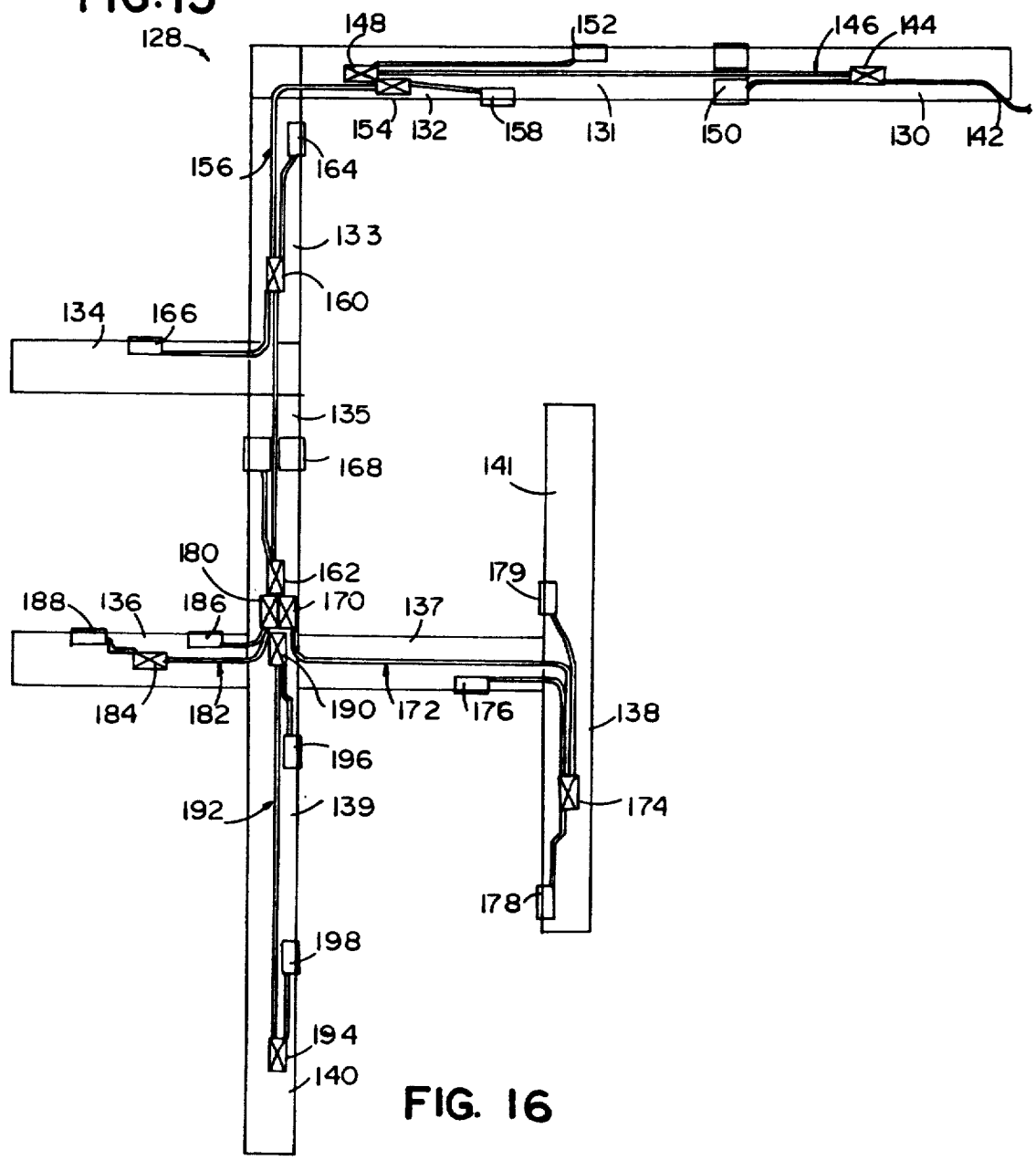
FIG. 16 is a top plan view of a wiring system in a plurality of furniture units.

A power distribution system 128, including powerways, a power-in, and outlet units according to the invention, is illustrated in FIG. 16. The power distribution system is illustrated in panels 130 through 141. Power is input to power distribution system 128 through a power tap-in 142. A connector of power tap-in 142 is connected to one port of a power block 144 of a powerway 146. Powerway 146 includes a second power block 148. A connector of a full-width outlet unit 150 is connected to a port of power block 144. A connector of a half-width outlet unit 152 is connected to a port of power block 148. Outlet units 150 and 152 provide power outlets for both sides of panel 131.

A port of a power block 154 of a powerway 156 is connected to a port of power block 148. Powerway 156 also includes power blocks 160 and 162. A connector of a half-width outlet unit 158 is connected to another port of power block 154. A connector of a half-width outlet unit 164 is connected to one port of power block 160. A connector of a half-width outlet unit 166 is connected to another port of power block 160. A connector of a full-width outlet unit 168 is connected to one port of power block 162. Outlet unit 158 provides outlets on one face of panel 132. Outlet unit 164 provides outlets on one face of panel 133. Outlet unit 166 provides outlets on one face of panel 134. Outlet unit 168 provides outlets on both faces of panel 135.

One port of a power block 170 of a powerway 172 is connected to one port of power block 162. Powerway 172 also includes a power block 174. Respective connectors of half-width outlet units 176, 178, and 179 are connected to respective ports of a outlet block 174. Outlet units 176, 178, and 179 provide power outlets for panels 137, 138, and. 141, respectively.

A port of power block 180 of a powerway 182 is connected to power block 162. Powerway 182 also includes a power block 184. A connector of a half-width outlet unit 186 is connected to outlet block 180. A connector of a half-width outlet unit 188 is connected to a port of power block 184. Outlet units 186 and 188 provide power outlets for panel 136.

Respective ports of a power block 190 of a powerway 192 are connected to respective ports of power blocks 170 and 180. Powerway 192 also includes a power block 194. A half-width outlet unit 196 is connected to one port of outlet block 190. A half-width outlet unit 198 is connected to one port of power block 194. Outlet unit 196 provides a power outlet for panel 139 and outlet unit 198 provides a power outlet for panel 140.

As can be seen, power distribution system 128 includes single powerways, such as powerway 146, which run through a plurality of panels. "L" branching (panels 132 and 133), "T" branching (panels 137, 138 and 141), and "X" branching (panels 135, 136, 137, and 139) are provided by interconnecting powerways or by connecting outlet blocks in one panel to power blocks in another panel. This provides a great degree of flexibility in arranging powerways and outlet blocks to minimize the number of connections and the number of powerways. Where three power block powerway 156 extends over a large distance, the center power block 160 may be used for branching or power outlet connection. The three power block powerway 156 thus serves the function of two power block powerways. Accordingly, the cost of power distribution system 128 is significantly reduced over prior art systems.

Each outlet unit in power distribution system 128 is connected to three contacts on its associated connector 99 (FIGS. 12 and 13) via conductors 101. Conductors 101 may be used to connect the power outlet blocks to the first, second, third or fourth supply circuit by selecting the appropriate contacts in connector 99. Additionally, the contact connected to isolated ground or safety ground may be connected to the outlet block by conductor 101. Accordingly, conductors 101 in the outlet units are used to select the supply circuit for each outlet block. In one envisioned embodiment, conductors 101 vary in length. This facilitates the connection of outlet blocks in one panel (e.g., outlet block 166) with a somewhat distant power block in another panel (e.g., power block 160). It also permits an outlet block (e.g., outlet block 186) in close proximity to a power block (e.g., power block 180) to be connected without having excess cord in the utility raceway.

Thus, it can be seen that the powerways with hermaphrodite connectors provide a versatile system wherein power distribution is extended through panels. Powerways include power blocks which provide a great deal of versatility in rearranging outlet blocks and providing branching. As also shown, outlet blocks for panels may be connected to power blocks in adjacent panels thereby reducing the number of powerways necessary for the system. The powerways themselves extend through more than one panel thereby reducing the total number of powerways. Accordingly, it can be seen that a panel electrification system providing ease of installation and versatility in rearrangement is disclosed. Each of the power blocks associated with the electrification system is readily connectable to power blocks associated with other powerways, outlet blocks and the like.

In the foregoing description, it will be readily perceived by those skilled in the art that modifications may be made to the invention without departing from the concepts disclosed herein. Such modifications are to be considered included in the following claims, unless these claims by their language expressly state otherwise.

The embodiments of the invention in which an exclusive property or privilege is claimed are defined as follows:

1. In a modular furniture system of the type having a plurality of individual furniture units that have utility raceways therethrough and are configured to define at least one workstation, the improvement of a lay-in power distribution arrangement therefor, comprising:
 a plurality of first powerways, each including a pair of power blocks interconnected by a flexible cable having a length selected such that the overall length of each of said first powerways is less than the length of the utility raceway associated with at least one of said furniture units;
 a plurality of second powerways, each including a pair of said power blocks interconnected by a flexible cable having a length selected such that the overall length of each of said second powerways is greater than the length of the utility raceway associated with at least one of said furniture units;
 a plurality of power outlets, each having a receptacle to receive a plug therein, and a flexible cable extending therefrom with a connector at its free end shaped for detachable connection with one of said power blocks;
 means for mounting said power outlets in said furniture units for convenient access;
 means for positioning said first and second powerways end-to-end in the utility raceways of said furniture units, such that the connector of each of said power outlets mounted on a selected furniture unit can reach at least one power block;

means for interconnecting each of said first and second powerways by interconnecting adjacently positioned ones of said power blocks associated therewith;

means for connecting the connector on each of said power outlets with the next adjacent one of said power blocks; and means for connecting a source of electrical power with one of said power blocks so as to provide electrical power to each of said power outlets throughout said workstation.

2. The power distribution system as defined in claim 1, wherein each of said power blocks include at least two ports and adjacent power blocks are interconnected by quick connecting respective quick-disconnect ports to provide a continuous power distribution system for said furniture units.

3. The power distribution system as defined in claim 2, wherein said ports of said power blocks are hermaphrodite ports.

4. The power distribution system as defined in claim 2, wherein each of said power blocks includes four ports.

5. The power distribution system as defined in claim 1, wherein each of said second powerways includes a first power block, a second power block and a third power block, said first and second power blocks interconnected by a first one of said powerway cables and said second and third power blocks are interconnected by a second one of said powerway cables.

6. The power distribution system as defined in claim 2, wherein each port includes a column of apertures, each column including the same number of apertures, and a respective contact positioned in each of said apertures.

7. The power distribution system as defined in claim 6, wherein said contacts positioned within an aperture of each column of one of said power blocks is connected to contacts positioned within the other columns of said one of said power blocks.

8. The power distribution system as defined in claim 7, wherein at least one of said second powerways includes four power blocks interconnected by respective cables.

9. A method for distributing electrical power throughout a modular furniture system of the type having a plurality of individual furniture units with utility raceways therethrough configured to define at least one workstation, said method comprising:

providing a plurality of first powerways, each including a pair of power blocks interconnected by a flexible cable having a length selected such that the overall length of each of the first powerways is less than the length of the utility raceway associated with at least one of the furniture units;

providing a plurality of second powerways, each including a pair of the power blocks interconnected by a flexible cable having a length selected such that the overall length of each of the second powerways is greater than the length of the utility raceway associated with at least one of the furniture units;

providing a plurality of power outlets, each having a receptacle to receive a plug therein, and a flexible cable extending therefrom with a connector at its free end shaped for detachable connection with one of the power blocks;

selecting a number of the furniture units to support activities for a given set of tasks;

positioning the selected furniture units in a contiguous side-by-side relationship to define at least one workstation;

selecting a number of the power outlets in accordance with the electrical power requirements of the workstation;

mounting the selected power outlets in the selected furniture units for convenient access;

selecting a number of the first and second powerways, and laying the same end-to-end in the utility raceways of the selected furniture units, such the connector associated with each of the selected power outlets mounted on a selected furniture unit may be connected to a power block;

interconnecting each of the selected first and second powerways by interconnecting adjacently positioned power blocks associated therewith;

connecting the connector on each of the selected power outlets with the next adjacent one of the power blocks; and connecting a source of electrical power with one of the power blocks associated with the selected powerways, so as to provide electrical power to each of the selected power outlets throughout the workstation.

* * * * *